United States Patent [19]
Dybas

[11] Patent Number: 5,555,764
[45] Date of Patent: Sep. 17, 1996

[54] GAUGE FOR MONITORING THE CONTENT OF A PROPANE TANK

[76] Inventor: Curtis D. Dybas, R.R. 2, Box 2316, Lake George, N.Y. 12845

[21] Appl. No.: 251,308

[22] Filed: May 31, 1994

[51] Int. Cl.⁶ ................................................ G01F 23/20
[52] U.S. Cl. ............................................ 73/296; 177/208
[58] Field of Search .................... 73/296, 299, 862.581, 73/862.584; 177/208, 209, 245, 254

[56] References Cited

U.S. PATENT DOCUMENTS

| | | | |
|---|---|---|---|
| 2,902,271 | 9/1959 | Clevenger et al. | 177/208 |
| 3,354,973 | 11/1967 | Farquhar | 177/208 |
| 4,014,398 | 3/1977 | Gresko | 177/208 |
| 4,286,680 | 9/1981 | Maltby et al. | 177/208 |
| 4,524,617 | 6/1985 | Krehel et al. | 73/296 |
| 4,583,606 | 4/1986 | Menon | 177/208 |

FOREIGN PATENT DOCUMENTS 670571  1/1939  Germany ................................. 73/296

Primary Examiner—William A. Cuchlinski, Jr.
Assistant Examiner—Andrew Hirshfeld
Attorney, Agent, or Firm—Norman B. Rainer

[57] ABSTRACT

A gauge for monitoring the propane content of a propane-containing vessel includes a platform member telescopically disposed above a base member to define an intervening region. A piston and a cylinder, interactively disposed within the intervening region upon a vertical axis form a fluid-impermeable chamber within the cylinder. A fluid is confined within the chamber and communicates by way of a conduit with a pressure-indicating device. Pressure generated upon the fluid in the chamber by virtue of the weight of a vessel resting atop the platform member is sensed, and indicated in terms of pounds of weight by the pressure-indicating device.

1 Claim, 1 Drawing Sheet

GAUGE FOR MONITORING THE CONTENT OF A PROPANE TANK

BACKGROUND OF THE INVENTION

1. Field of the Invention

This invention relates to a fuel gauge for determining the quantity of fuel in a tank of propane. More particularly, this invention relates to a fuel gauge suitable for use with a liquid propane tank that services a recreational-type gas grill.

2. Description of the Prior Art

Gas grills employing a liquid propane gas tank fuel supply have become increasingly popular. Such popularity is due in part to the relative portability of such grills, the relatively low fuel consumption of the grills, and the desirable cooking characteristics of gas. One of the few problems that has been encountered by the many users of gas grills employing a liquid propane tank fuel supply has been that of accurately determining the propane fuel supply so that a new fuel supply may be secured before the fuel is exhausted, or the fuel does not run out unexpectedly.

A number of devices have been disclosed which are directed to measuring or indicating the fuel level in a tank of a type such as a conventional twenty-pound liquid propane tank commonly employed with gas grills. Some of the prior art tank fuel level indicator devices employ a weighing means in one form or another to provide an indication of the fuel level of a tank. For example, U.S. Pat. No. 4,413,515 discloses a gauging system for a barbecue fuel tank wherein the tank is mounted in a tiltable manner so that the top of the tank pulls laterally upon a spring-biased rod. The extent of tilting force is dependent upon the weight of fuel in the tank, and such force is measured by the distance the rod is pulled against the restraint of the spring.

U.S. Pat. No. 4,524,617 discloses a fuel gauge in the form of a circular weighing platform upon which a propane tank is seated. Springs located within the platform are stressed proportionately to the weight of the tank and its contents, and cause a pointer to move in a circumferentially extending path along a series of indicator markings.

Such prior devices generally involve numerous interactive components susceptible to damage in the cause of heavy use. The propane tank generally remains outdoors in unprotective association with the gas grill that it services. The rigors of outdoor weathering cause corrosion effects that are seriously deleterious to metal components such as springs and their interactive mechanisms. The accumulation of air-borne debris such as dust, leaves, dead insects and pollen can also adversely effect moving parts. The durability and/or reliability of such earlier devices is therefore compromised by such outdoor environment factors. Some of the prior fuel gauge devices are designed to operate only on propane tanks of specific design and require several manipulative steps to cause the gauge to interact with the tank. Some of the gauges are not compatible with a gas grill or other equipment serviced by the propane.

It is therefore an object of the present invention to provide a propane gauge having reduced susceptibility to deleterious outdoor environment factors.

It is another object of this invention to provide a fuel gauge as in the foregoing object which is easily interactive with propane tanks of various design.

It is a further object of the present invention to provide a fuel gauge of the aforesaid nature which is readily compatible with appliances employing said fuel and which can operate at a location removed from said appliances.

It is a still further object of this invention to provide a fuel gauge of the aforesaid nature of sturdy yet simple construction amenable to low cost manufacture.

These objects and other objects and advantages of the invention will be apparent from the following description.

SUMMARY OF THE INVENTION

The above and other beneficial objects and advantages are accomplished in accordance with the present invention by a gauge to be placed below a propane-containing vessel for determining the quantity of propane in said vessel, said gauge comprising:

a) a platform member having upper and lower surfaces, a circular perimeter, and a skirt wall downwardly emergent from said perimeter, b) a base disposed below said platform member and having top and bottom surfaces, a circular boundary, and a receiving wall upwardly emergent from said boundary and configured to receive said skirt wall in close-fitting telescoping relationship, and thereby defining with said platform member an intervening enclosed region, c) piston means centered within said enclosed region in fixed engagement with either said platform member or base, d) cylinder means centered within said enclosed region in fixed engagement with either said platform member or base not already having said piston means, and configured to interact with said piston-means in close-fitting reciprocal sliding relationship along a substantially vertical axis, e) sealing means disposed between said piston means and cylinder means to create a fluid-impermeable chamber within said cylinder means, f) a fluid confined within said chamber, g) pressure-indicating means disposed exteriorly of said enclosed region, and h) conduit means interactively communicating between said chamber and pressure-indicating means.

In preferred embodiments, the platform member and base are each monolithic structures having been fabricated of plastic by way of a molding operation. The piston means and cylinder means are preferably continuous integral extensions of the base or platform member with which they are associated. The pressure-indicating means preferably has re-zeroing means which permits accommodation to the starting or full weight of a newly employed propane tank.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
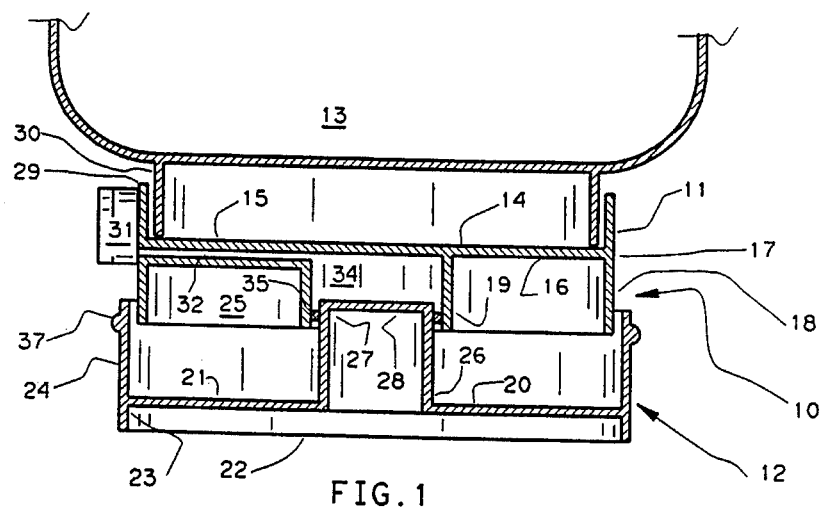
FIG. 1 is a vertical sectional view of an embodiment of the fuel gauge of the present invention.
Figure 2:
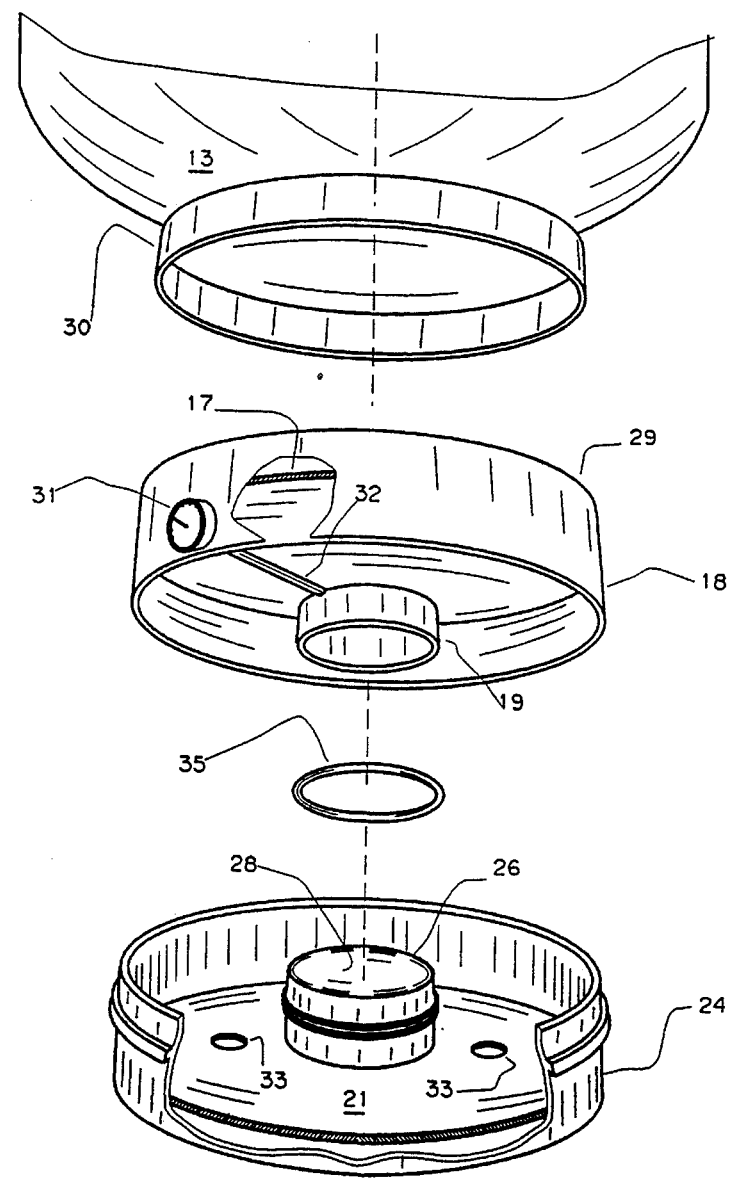
FIG. 2 is an exploded perspective view of the embodiment of FIG. 1, with portions broken away to reveal interior details.

Referring to FIG. 1, an embodiment of the fuel gauge 10 of this invention, comprised of platform member 11 interactive with base 12 is shown in functional relationship with a propane tank 13 having a circular pedestal 30.

Platform member 11 is comprised of flat center panel 14 having upper and lower surfaces 15 and 16, respectively, and a circular perimeter 17. A skirt wall 18 of cylindrical contour is downwardly directed from said perimeter as a continuous integral extension of panel 14. A retaining wall 29 extends upwardly from panel 14 as an extension of skirt wall 18, and is dimensioned to receive pedestal 30. Cylinder means 19 extends orthogonally downward from lower surface 16 as an open-ended cylindrical structure whose axis is centered upon panel 14. Said platform member, including cylinder means 19, is preferably fabricated of plastic as a monolithic structure. Suitable plastics include polypropylene, ABS (acrylonitrile-butadiene-styrene), polyamide, polyester, polyacetal and other thermoplastic materials.

Base 12 is disposed below said platform member and is comprised of flat interior panel 20 having top and bottom surfaces 21 and 22, respectively, and circular boundary 23. Panel 20 may have drainage holes 33 to prevent accumulation of rain water within said base. A receiving wall 24 of cylindrical contour is upwardly emergent from said boundary and configured to receive said skirt wall in close-fitting telescoping relationship. Such interaction of the base with the platform member defines an intervening enclosed region 25. Piston means in the form of cylindrical structure 26 extends upwardly from the center of top surface 21. The distal extremity 27 of said piston means is sealed by a flat panel 28 in parallel disposition to top surface 21. Piston means 26 is dimensioned and positioned so as to penetrate cylinder means 19 in close-fitting sliding relationship therewith. In alternative embodiments, the relative positions of the piston means and cylinder means may be reversed, namely the piston being associated with the platform member, and the cylinder means being associated with the base member. An annular rim 37 may be disposed upon the exterior surface of receiving wall 24 for the purpose of securing the base in a clamp ring of conventional design utilized on some grills.

Sealing means in the form of O-ring 35 is disposed between said piston means and cylinder means in a manner to create a fluid-impermeable chamber 34 within said cylinder means. A gaseous or liquid fluid is confined within said chamber.

Pressure-sensing means 31 is mounted upon the exterior of the platform member. Said pressure-sensing means may employ a bourdon-type principle whereby an indicator needle is driven in a circuitous path along a scale of markings. Conduit means in the form of tube 32 communicates between said chamber and said pressure-sensing means. By virtue of such construction, the weight of a propane tank and its contents resting atop platform member 11 produces a pressure within chamber 34 that is proportionate to said weight. The pressure is transmitted to pressure-sensing means 31, where an indicator needle or other equivalent indicating mechanism displays a weight reading, namely the weight of the propane tank and its contents. By knowing the tare or empty weight of the tank, and the weight of propane at filled status, weight readings will provide accurate information as to the state of depletion of the propane supply. A re-zeroing adjustment on the pressure-sensing means gives the user greater operational control. In the illustrated embodiment, tube 32 is an integral part of platform member 11, having been formed by virtue of a molding operation that produces platform member 11 from a plastic material. In alternative embodiments, tube 32 may be a separate component, and of considerable length, and may extend to a pressure sensing means 31 located remotely from the grill or other appliance.

The fuel gauge of this invention is constructed in a manner so as to minimize moving or otherwise interactive components. Enclosed region 25 serves to protect the piston and cylinder means from environmental factors. No specialized manipulation is needed when changing propane tanks.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A gauge to be placed below a propane-containing vessel for determining the quantity of propane in said vessel, said gauge comprising:

a) a platform member having upper and lower surfaces, a circular perimeter, a skirt wall of circular cylindric contour downwardly emergent from said perimeter, and a retaining wall directed upwardly with respect to said upper surface as an extension of said skirt wall, b) a base disposed below said platform member and having top and bottom surfaces, a circular boundary, and a receiving wall of circular cylindric contour upwardly emergent from said boundary and configured to receive said skirt wall in close-fitting telescoping relationship, and thereby defining with said platform member an intervening enclosed region, c) piston means of circular cylindric contour centered within said enclosed region in fixed engagement with one of said platform member and said base, d) cylinder means of circular cylindric contour centered within said enclosed region in fixed engagement with one of said platform member and said base not already having said piston means, and configured to interact with said piston means in close-fitting reciprocal sliding relationship along a substantially vertical axis, e) a sealing O-ring disposed between said piston means and said cylinder means to create a fluid-impermeable pressure-retaining chamber within said cylinder means, f) pressure-indicating means disposed exteriorly of said enclosed region, and comprising an indicator needle which displays a weight reading based upon pressure generated within said chamber, said weight reading corresponding to the amount of propane in said vessel, and re-zeroing means permitting accommodation to the starting weight of a newly employed propane-containing vessel, and g) conduit means interactively communicating between said chamber and said pressure-indicating means, h) said platform member plus one of said piston means and cylinder means being a monolithic structure, and i) said base plus one of said piston means and cylinder means being a monolithic structure.

\* \* \* \* \*